A. HILLIER.
SPRING ATTACHMENT FOR AUTOMOBILES.
APPLICATION FILED OCT. 9, 1915.
1,183,459.
Patented May 16, 1916.
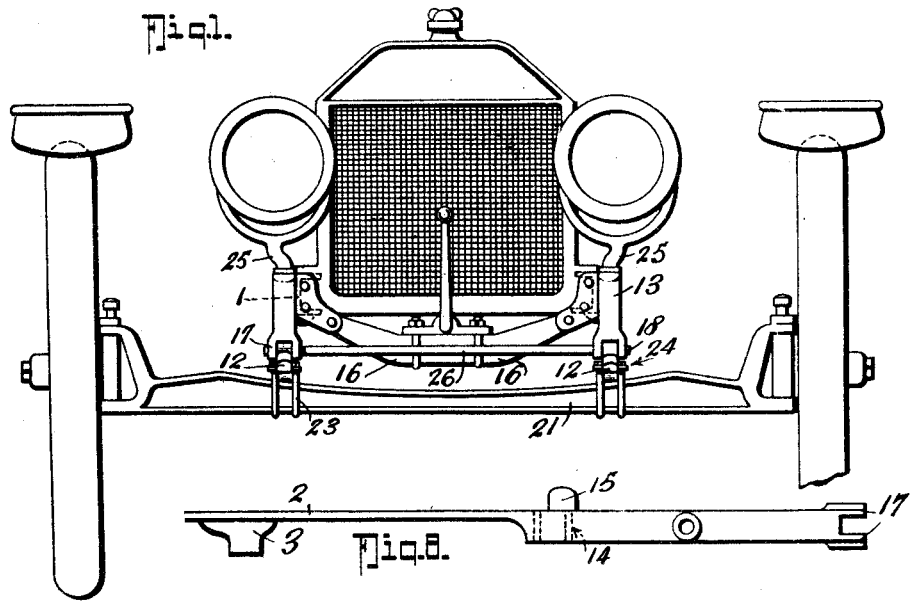
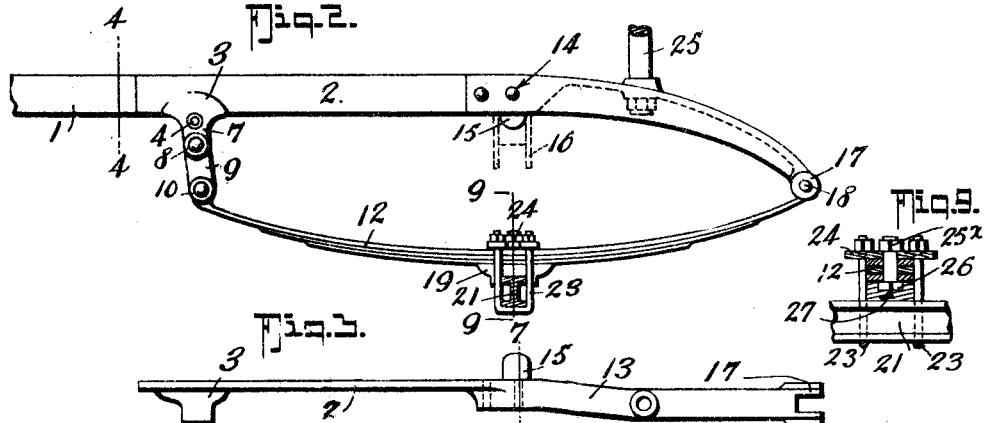
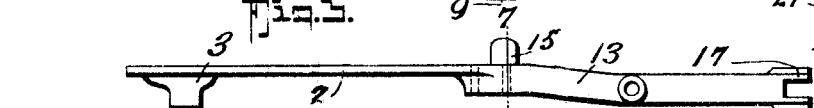
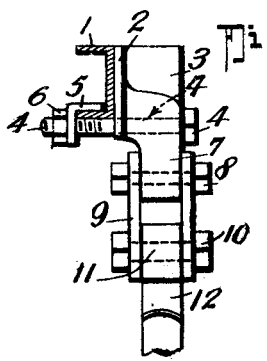
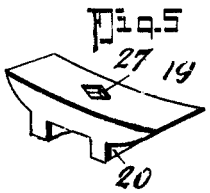
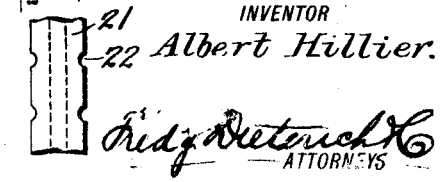
INVENTOR
Albert Hillier.
ATTORNEYS

UNITED STATES PATENT OFFICE.

ALBERT HILLIER, OF PORTLAND, OREGON.

SPRING ATTACHMENT FOR AUTOMOBILES.

1,183,459.  Specification of Letters Patent.  Patented May 16, 1916.

Application filed October 9, 1915. Serial No. 55,088.

*To all whom it may concern:*

Be it known that I, ALBERT HILLIER, residing at Portland, in the county of Multnomah and State of Oregon, have invented certain new and useful Improvements in Spring Attachments for Automobiles, of which the following is a specification.

My invention relates to certain new and useful improvements in that type of automobile known as the "Ford Model T", and the invention primarily has for its object to provide front spring brackets and spring attachments of the longitudinal type as substitutes for the present transverse front spring construction, and the invention further has for its object to provide a means whereby the radius rods or other trussing on the front axle may be omitted.

Again, it is the object of my invention to provide an easier spring riding quality for automobiles of the type stated and in its detailed nature the invention also includes those novel features of construction, combination and arrangement of parts, all of which will be first fully described and then be specifically pointed out in the appended claims, reference being had to the accompanying drawing, in which—

Figure 1 is a front elevation of a portion of a Ford Model T automobile with the invention applied. Fig. 2 is a detail side elevation on an enlarged scale of one of the spring attachments that constitutes the present invention. Fig. 3 is a top plan view of the spring bracket. Fig. 4 is a section on the line 4—4 of Fig. 2. Fig. 5 is a detail perspective view of one of the spring rest blocks. Fig. 6 is a detail top plan view of a portion of the front axle showing the shackle bolt recesses. Fig. 7 is a detail cross section on the line 7—7 of Fig. 3. Fig. 8 is a top plan view of a modified form of the spring bracket, the same being straight instead of offset, as indicated in the form shown in Fig. 3. Fig. 9 is a detail section on the line 9—9 on Fig. 2.

In the drawing, in which like numerals indicate like parts in all of the figures, 1 represents the frame of the automobile which, in the type stated, is of the channel iron section, the channel irons of the frame being connected at the front by the usual transverse spring saddle or brace 16 whereby to form a rigid structure with the channel irons, the spring saddle brace 16 being also of channel construction.

The spring bracket which constitutes a part of my present invention consists of a flat plate-like portion 2 that extends from the front of the frame rearwardly and is formed with a lateral extension 3 that terminates in a shackle eye 7 to receive the bolt 8 that pivots the shackle links 9 thereto.

4 designates a clamp bolt which passes through the bracket portion 3 and through the L plate 5 that clamps over the channel iron 1 and is secured by a suitable nut 6.

The shackle links 9 are pivoted at 10 to the eye 11 of the spring pack 12. The spring pack 12 which may be of the usual construction is held together by the usual tie bolt 25×, the head 26 of which is designed to rest in the recess 27 of the saddle block 19.

The bracket in addition to the flat portion 2 has the forwardly and rearwardly offset channeled extension 13 which terminates in the bearings 17 for the spring bolt 18, the bracket 2 being held at the front end by a bolt 14 that passes through the frame and also by a lip 15 that projects beneath the frame, preferably in the channel of the usual spring saddle 16.

The spring pack 12, as before stated, rests on the saddle block 19, and the saddle block 19 is provided with flanges 20 to embrace the axle 21 to prevent movement in the longitudinal direction of the machine and in order to prevent lateral movement of the springs and saddle block the axle is notched or filed out as at 22 to receive the spring clip bolts 23 that pass through a clamp plate 24 and are secured by nuts in the usual way. It will be observed that with my construction the use of the radius rods now employed on the Ford Model T may be done away with. By providing the saddle block with flanges 20 and the recess for the spring tie bolt, creeping of the spring pack forwardly is avoided and also rearwardly with respect to the saddle block and lateral creeping of the saddle block is prevented by reason of the recesses 22 in which the clips 23 lie. It will be noticed that the attachment can be readily applied to any of the machines of this model and type and requires no machine work for its application. The springs 12 which are employed in my construction are the same springs that are at present employed as the front springs for the Ford Model T automobile and no change in the spring pack construction is required over what is the present practice, it being understood, of course, that in lieu of the single transverse front spring two such springs are employed in longitudinal positions.

From the foregoing description taken in connection with the accompanying drawing, it is thought the complete construction, operation and advantages of this invention will be readily understood by those skilled in the art.

If desired, the bracket may extend straight, as shown in Fig. 7, instead of being offset, although the offset form is preferred since it brings the spring construction closer to the ends of the axle and furthermore lamp brackets 25 may be secured to the spring bracket so as to do away with the vibration in the lamps. The front ends of the spring brackets may be secured together by the brace rod 26, if desired.

What I claim is:

1. An attachment for automobiles comprising an extension spring bracket, means for securing said bracket to the frame of the automobile to project forwardly therefrom, a spring pack, one end of which is secured to the projecting end of the said bracket, said bracket having a rear projection, and a shackle link connection between the other end of said spring pack and said rear projection, and means for securing said spring pack to the front axle.

2. An attachment for automobiles of the Ford Model T type which comprises a bracket member consisting of a flat body portion designed to lie against the front end of the frame, a clamp for clamping said body portion to the frame, said body portion having a lug to project under the frame, said bracket including a forwardly and downwardly projecting portion extending beyond the frame, a spring pack having one end secured to said projecting portion, a shackle link connection between the other end of said spring pack and the rear portion of said bracket, a saddle block having flanges to project over the front axle, said front axle having clip recesses at each side of the saddle block and spring clip devices held in said recesses to secure said spring pack and said saddle block to the axle.

3. In combination with the longitudinal frame channel irons and the front channeled spring saddle of an automobile; of a spring bracket comprising a body portion to lie against the frame and a forward extension projecting beyond the frame, said bracket member having a lug to project beneath the frame into the channel of said front spring saddle, clamping devices for securing said bracket to the frame, a spring pack directly connected to the front projecting end of said bracket and shackle connected to the rear end of the same, and means for securing said spring pack to the axle.

4. In combination with the longitudinal frame channel irons and the front channeled spring saddle of an automobile; of a spring bracket comprising a body portion to lie against the frame and a forward extension projecting beyond the frame, said bracket member having a lug to project beneath the frame into the channel of said spring saddle, clamping devices for securing said bracket to the frame, a spring pack directly connected to the front projecting end of the said bracket and shackle connected to the rear end of the same, means for securing said spring pack to the axle, said last named means comprising a saddle block transversely channeled to receive the axle, a clamp plate, clip bolts around the axle and secured to said clamp plate, said axle having recesses to receive said clip bolts substantially as shown and described.

ALBERT HILLIER.